United States Patent
Durojaiye et al.

(10) Patent No.: US 9,626,020 B2
(45) Date of Patent: Apr. 18, 2017

(54) HANDEDNESS DETECTION FROM TOUCH INPUT

(71) Applicant: Microsoft Technology Licensing, LLC, Redmond, WA (US)

(72) Inventors: Olumuyiwa M Durojaiye, Bothel, WA (US); David Abzarian, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/485,510

(22) Filed: Sep. 12, 2014

(65) Prior Publication Data
US 2016/0077616 A1 Mar. 17, 2016

(51) Int. Cl.
*G06F 3/041* (2006.01)
*G06F 3/0354* (2013.01)
*G06F 3/0488* (2013.01)

(52) U.S. Cl.
CPC .......... *G06F 3/041* (2013.01); *G06F 3/03545* (2013.01); *G06F 3/0416* (2013.01); *G06F 3/0418* (2013.01); *G06F 3/0488* (2013.01); *G06F 2203/04101* (2013.01); *G06F 2203/04104* (2013.01); *G06F 2203/04106* (2013.01); *G06F 2203/04808* (2013.01)

(58) Field of Classification Search
CPC ....... G06F 3/041; G06F 3/0412; G06F 3/0416
See application file for complete search history.

(56) References Cited

U.S. PATENT DOCUMENTS

| 7,847,789 | B2 | 12/2010 | Kolmykov-Zotov et al. |
| 8,527,722 | B1 | 9/2013 | Okada |
| 8,660,978 | B2 | 2/2014 | Hinckley et al. |
| 8,717,327 | B2 | 5/2014 | Hering |
| 2003/0080946 | A1 | 5/2003 | Chuang |
| 2006/0109252 | A1 | 5/2006 | Kolmykov-Zotov et al. |
| 2007/0152976 | A1 | 7/2007 | Townsend et al. |

(Continued)

FOREIGN PATENT DOCUMENTS

| EP | 1659481 | 5/2006 |
| EP | 2474887 | 7/2012 |

(Continued)

OTHER PUBLICATIONS

International Search Report and Written Opinion for PCT Application No. PCT/US2015/049546, mailed Nov. 23, 2015, 19 pages.

(Continued)

*Primary Examiner* — Olga Merkoulova
(74) *Attorney, Agent, or Firm* — Timothy Churna; Dan Choi; Micky Minhas

(57) ABSTRACT

Techniques and architectures for detecting the handedness of a user from touch input and suppressing unintentional touch input are described. The techniques and architectures may analyze short-lived contacts that occur on a touch surface around a same time as input from an input tool to determine a hand that a user is using to hold the input tool. An inactive region may be established for the touch surface based on the hand determination and/or contextual information related to the user, the touch surface and so on. The inactive region may allow unintentional input to be identified and suppressed.

20 Claims, 10 Drawing Sheets

(56) References Cited

U.S. PATENT DOCUMENTS

| | | | |
|---|---|---|---|
| 2010/0085317 A1* | 4/2010 | Park | G06F 1/1626 345/173 |
| 2011/0012855 A1 | 1/2011 | Yeh et al. | |
| 2011/0148770 A1 | 6/2011 | Adamson et al. | |
| 2012/0262407 A1* | 10/2012 | Hinckley | G06F 3/038 345/173 |
| 2012/0313865 A1 | 12/2012 | Pearce | |
| 2013/0021269 A1 | 1/2013 | Johnson et al. | |
| 2013/0227433 A1 | 8/2013 | Doray et al. | |
| 2013/0300672 A1 | 11/2013 | Griffin | |
| 2013/0300696 A1 | 11/2013 | Haran et al. | |
| 2013/0321328 A1* | 12/2013 | Ahn | G06F 3/03549 345/174 |
| 2013/0328805 A1 | 12/2013 | Kim | |
| 2013/0328832 A1 | 12/2013 | Boumgarten | |
| 2014/0022193 A1 | 1/2014 | Kim et al. | |
| 2014/0035873 A1 | 2/2014 | Hering | |
| 2014/0104189 A1 | 4/2014 | Marshall et al. | |
| 2014/0104225 A1 | 4/2014 | Davidson et al. | |
| 2014/0145943 A1 | 5/2014 | Sheynblat et al. | |
| 2014/0204035 A1* | 7/2014 | Chang | G06F 3/0416 345/173 |
| 2016/0077663 A1 | 3/2016 | Durojaiye et al. | |

FOREIGN PATENT DOCUMENTS

| | | | |
|---|---|---|---|
| EP | 2662756 | 11/2013 | |
| EP | 2674849 | 12/2013 | |
| EP | 2687 954 A2 * | 1/2014 | G06F 3/0354 |
| EP | 2687954 | 1/2014 | |
| EP | 2717133 | 4/2014 | |
| FR | 2979025 | 2/2013 | |

OTHER PUBLICATIONS

International Search Report and Written Opinion for PCT/US2015/049545 mailed Nov. 23, 2015, 18 pages.

Office action for U.S. Appl. No. 14/485,493, mailed on Dec. 3, 2015, Durojaiye et al., "Inactive Region for Touch Surface Based on Contextual Information", 15 pages.

Severson, et al., "Maintaining User Experience as Touchscreens Grow", In White Paper Cypress Perform, Oct. 2013, 8 pages.

Office action for U.S. Appl. No. 14/485,493, mailed on Apr. 27, 2016, Durojaiye et al., "Inactive Region for Touch Surface Based on Contextual Information", 17 pages.

The PCT Written Opinion of the International Preliminary Examining Authority for PCT application No. PCT/US2015/049546 dated Jul. 25, 2016, 11 pages.

The PCT Written Opinion of the International Preliminary Examining Authority for PCT application No. PCT/US2015/049545 dated Jul. 28, 2016, 11 pages.

"The N-Trig Approach to Multi-Touch: DuoSense", Dec. 24, 2008, http://www.n-trig.com/Data/Uploads/Misc/N-trig_Paper_on_Multi-Touch_2008.pdf, 16 pages.

Office action for U.S. Appl. No. 14/485,493, mailed on Dec. 12, 2016, Durojaiye et al., "Inactive Region for Touch Surface Based on Contextual Information", 15 pages.

"International Preliminary Report on Patentability Issued in PCT Application No. PCT/US2015/049545", Mailed Date: Dec. 14, 2016, 12 Pages.

* cited by examiner

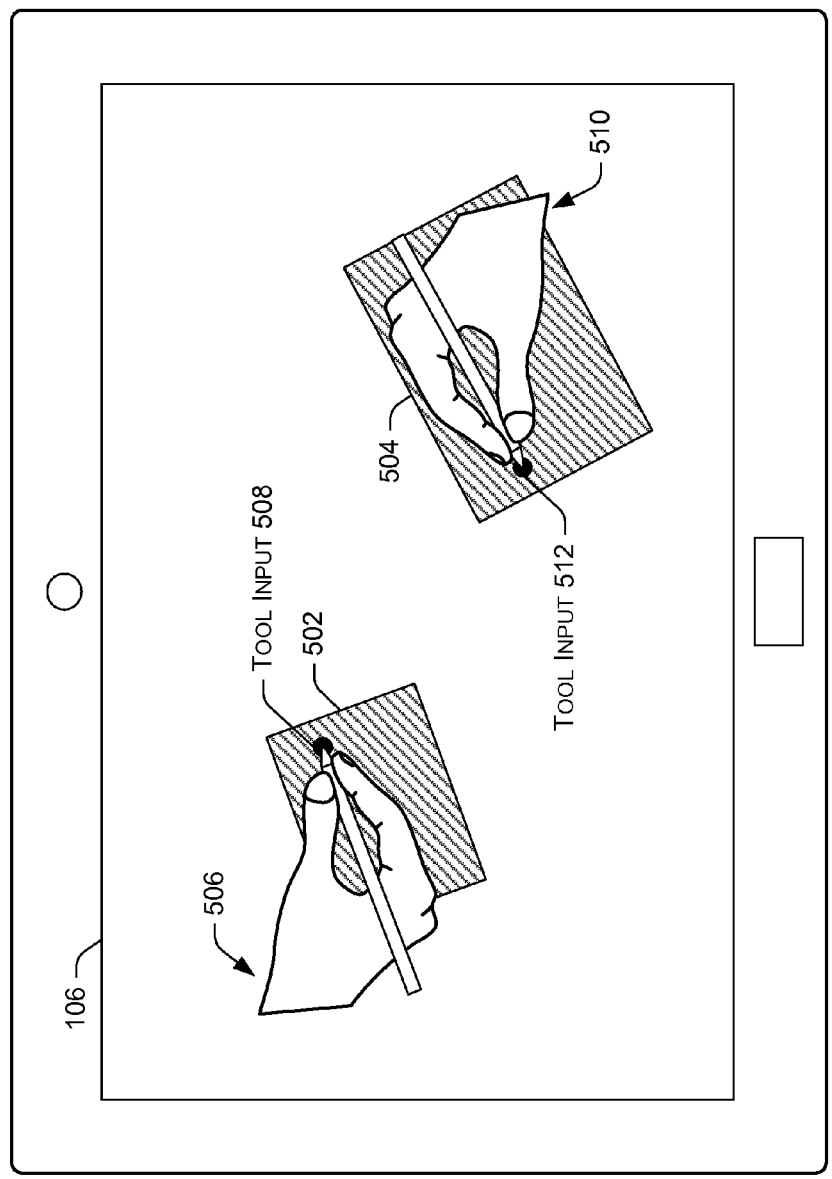

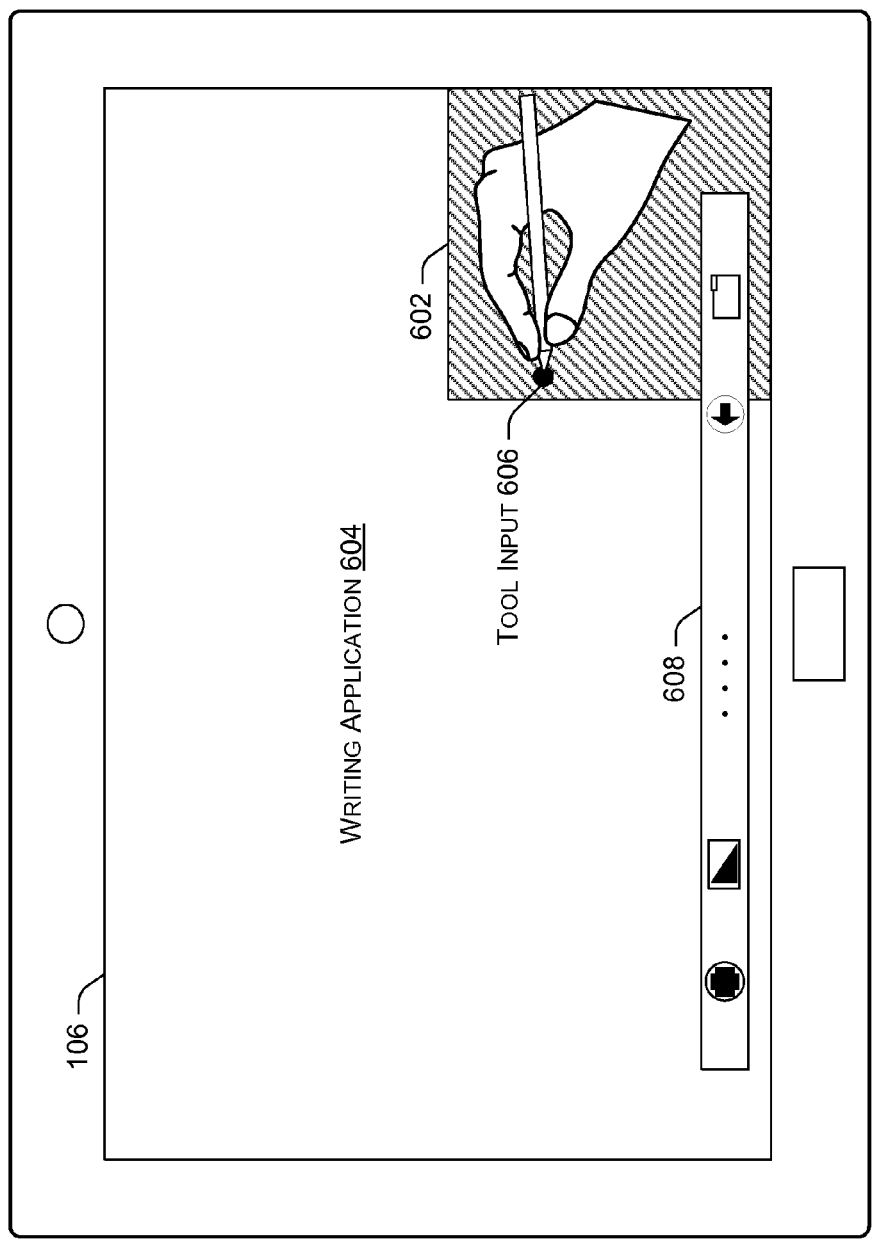

HANDEDNESS DETECTION FROM TOUCH INPUT

BACKGROUND

Many computing devices utilize touch surfaces, such as touch pads and touch screens. A touch surface receives touch input that causes a computing device to perform an action, such as selecting an icon, scrolling through a page and so on. In some instances, a user may employ a stylus or pen to provide touch input. When using the stylus or pen, the user may inadvertently contact the touch surface with a palm or other portion of a hand, triggering the performance of an inadvertent action.

SUMMARY

This disclosure describes techniques and architectures for detecting the handedness of a user from touch input and suppressing unintentional touch input. The handedness of the user may be detected by analyzing short-lived inputs that have recently occurred on the touch surface (e.g., during a period of time leading up to the detection). The short-lived inputs may have remained on the touch surface for less than a particular amount of time. The locations of the short-lived inputs may be analyzed along with a location of touch input from an input tool, such as a stylus, pen or other item. The analysis may determine whether the short-lived inputs are clustered together, located on a particular side of the touch input from the input tool, located within a particular distance to the touch input from the input tool and so on. From the analysis, it may be determined whether the user is employing a right-hand or a left-hand to interact with the touch surface.

An inactive region may be defined on a touch surface based on the handedness detection and/or contextual information related to the user and/or the touch surface. Input that is received in the inactive region may generally be classified as unintentional and disregarded. Although there may be circumstances where input in the inactive region is classified as intentional and processed. The inactive region may be sized, shaped and/or positioned on the touch surface based on the contextual information. The contextual information may indicate a number of users that are interacting with the touch surface, a size or shape of the touch surface, a size or shape of touch input from the user, information about the user that is associated with the input tool, information about an application that is currently running on a device that includes the touch surface, an orientation of the touch surface, a language of the user and so on.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates example inactive regions that may be used when multiple users are interacting with a device.

FIG. 6 illustrates an example inactive region that is defined based on information about an application that is running on a device.

DETAILED DESCRIPTION

Figure 1:
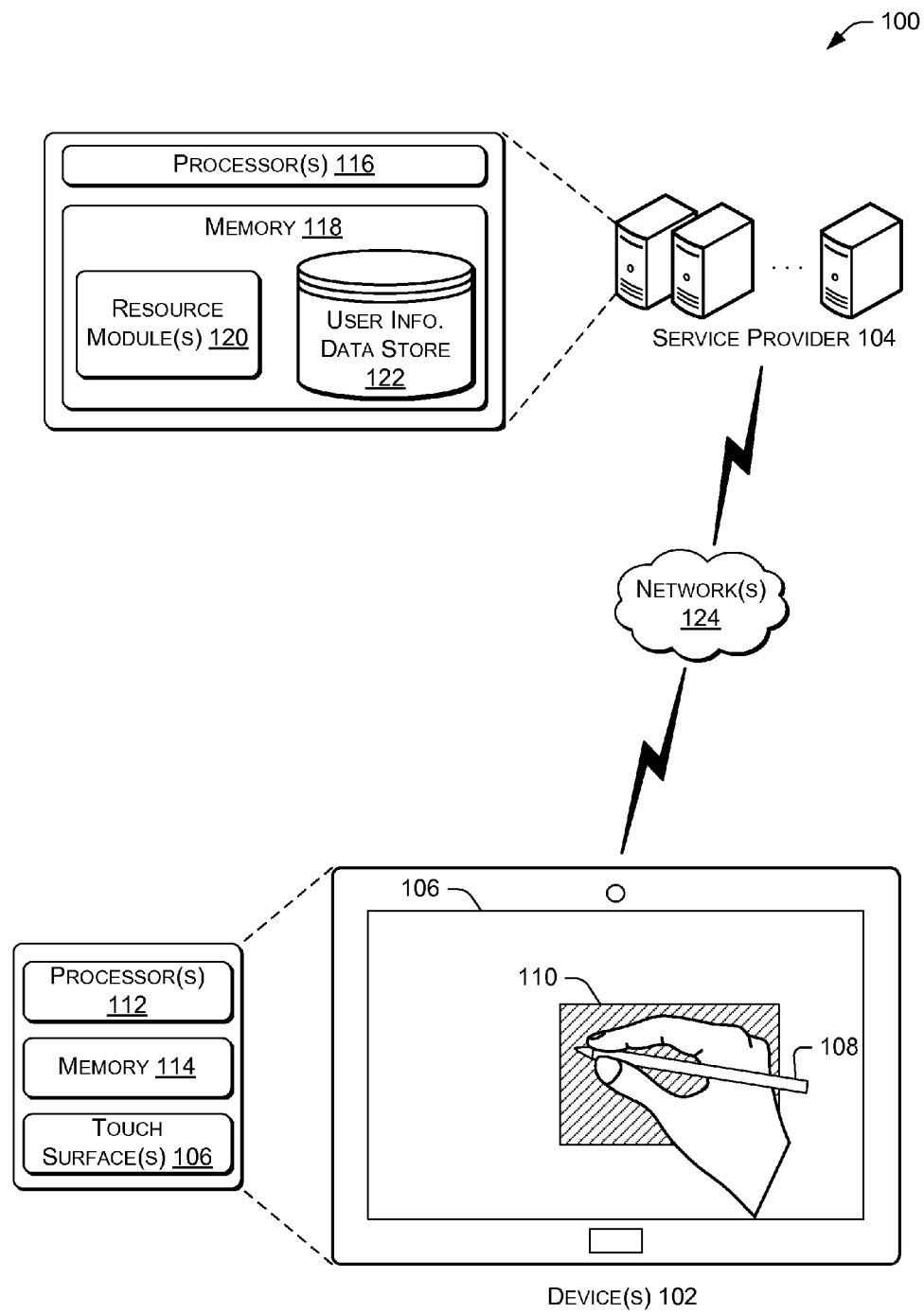
FIG. 1 illustrates an example architecture in which techniques described herein may be implemented.

In many devices, unintentional input on a touch surface may trigger the performance of an unintended action. In some instances, a user may inadvertently provide touch input while using a stylus or pen to interact with the touch surface. For example, the user may unintentionally rest the user's palm on the touch surface as the user writes on the touch surface with a stylus. The unintentional input from the user's palm may cause an input stroke to be written on a display or other unintended action to be performed. This may provide a poor user experience with the touch surface.

This disclosure describes techniques and architectures for detecting the handedness of a user from touch input and suppressing unintentional touch input. As noted above, in some instances a user may unintentionally rest a palm or other portion of a hand on a touch surface as the user interacts with the touch surface with an input tool, such as a stylus or pen. The techniques and architectures herein may analyze short-lived contacts that occur around a same time as input that is received from the input tool. The analysis may determine a hand that the user is using to hold the input tool. From this, an inactive region may be established on the touch surface to suppress unintentional input. In some instances, by utilizing an inactive region to disregard unintentional input, the user may simultaneously provide input with an input tool and input with a finger.

The handedness of the user may be detected by analyzing short-lived inputs that have recently occurred on the touch surface. The short-lived inputs may have remained on the touch surface for less than a particular amount of time (e.g., less than 1 or 2 seconds). In one example, a short-lived input may arise when a user unintentionally rests a palm or finger on a touch surface just before placing an input tool on the touch surface, and subsequently removes the palm or finger from the touch surface. The locations of the short-lived inputs may be analyzed along with a location of a touch input from the input tool. The analysis may generally determine whether the short-lived inputs are clustered together, located on a particular side of the touch surface relative to the touch input from the input tool (e.g., determine a ratio of a number of short-lived inputs on the right side of the input tool to a number of short-lived inputs on the left side of the input tool), located within a particular distance to the touch input from the input tool and so on. This information may provide an indication as to whether a short-lived input is provided by the user's palm. If so, the short-lived contact may provide meaningful information regarding the user's handedness. For example, it may be determined that a user is using a right-hand if more short-lived inputs contacted the touch surface on a right side of the input tool than on the left side of the input tool. In another example, it may be determined that a user is using a left-hand if the short-lived inputs contacted the touch surface in a cluster on the left side of the input tool. In yet other examples, the handedness of the user may be determined based on other information about the short-lived inputs.

Based on the handedness determination and/or other information, an inactive region may be defined on the touch surface. Input that is received in the inactive region may generally be classified as unintentional and disregarded. Although there may be circumstances where input in the inactive region is classified as intentional and processed. The inactive region may be positioned in the touch surface relative to a location of touch input from the input tool and extend to encompass an area where the user's palm or fingers are likely to rest on the touch surface. To illustrate, for a right-handed user, the inactive region may extend to the right of the input tool a particular distance and extend from the input tool to the bottom of the touch surface or a particular distance. The inactive region may have a variety of shapes and/or sizes. The inactive region may be move in relation to the input tool so that unintentional input is disregarded at different locations of the input tool.

In many instances, the inactive region is defined based on contextual information. The contextual information may provide meaningful information about where the user's palm or fingers may unintentionally rest on the touch surface. The inactive region may be sized, shaped and/or positioned on the touch surface from the contextual information. The contextual information may indicate a number of users that are interacting with the touch surface, a size or shape of the touch surface, a size or shape of touch input from the user, information about the user that is associated with the input tool, information about an application that is currently executing, an orientation of the touch surface, a language of the user and so on.

In many instances, touch input from an input tool may be distinguished from touch input from a user's hand (e.g., finger, palm, wrist, etc.). In some examples, an input tool comprises an active pen that generates a signal that is detected by the touch surface. The touch surface may detect actual contact of the active pen on the touch surface and/or detect when the active pen is in range of the touch surface (e.g., located within a particular proximity to the touch surface). Further, in some examples an area and/or pressure of contact of touch input may be analyzed to determine if the touch input satisfies one or more criteria (e.g., has less than a predetermined area/size, has a predetermined shape, is associated with a particular amount of pressure on the touch surface, etc.). If the one or more criteria are satisfied, then the touch input may be classified tool input, instead of input from a user's hand. This may allow touch input to be detected from any type of item or object, such as a passive stylus, passive pen (e.g., one that does not generate a detectable signal) or another item.

The techniques and architectures discussed herein may intelligently identify a handedness of a user. In one example, the techniques and architectures may determine the handedness of a user that rests a palm or finger on a touch surface just before, or at the same time, as placing a stylus or pen on the touch surface, and subsequently removes the palm or finger after maintaining the palm or finger for a short period of time. Further, the techniques and architectures may determine a handedness of a user when irregular input patterns are detected on a touch surface (e.g., providing touch inputs on both sides of an input tool, some of which are unintentional and some of which are intentional). The irregular input patterns may arise when the touch surface is interacted with in an unconventional manner (e.g., the user knuckling a stylus, a hand that is holding the input tool including fingers that are spread out, etc.).

Further, the techniques and architectures discussed herein may intelligently classify input as unintentional by defining an inactive region on a touch surface. In some instances, the inactive region may be defined from a handedness of the user and/or contextual information. This may allow inadvertent user input to be suppressed and avoid performance of unintentional actions, which may ultimately enhance the user's experience.

Moreover, the techniques and architectures discussed herein may conserve processing resources and/or battery life. For example, the inactive region may allow touch input to be automatically classified as unintentional, while avoiding an in-depth analysis of touch inputs individually, which may consume relatively large amounts of processing resources and/or battery life.

Although in many instances discussed herein, information about the handedness of a user is used to establish an inactive region, the handedness information may be utilized to perform a variety of other operations. Further, an inactive region may be defined based on a variety of information that may not include information about the handedness of the user.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

Example Architecture

FIG. 1 illustrates an example architecture 100 in which techniques described herein may be implemented. The architecture 100 includes one or more devices 102 (hereinafter "the device 102") configured to receive touch input from a user and/or other objects. While interacting with the user, the device 102 may identify a handedness of the user, identify inadvertent touch input on a touch surface and perform a variety of other operations. The architecture 100 also includes a service provider 104 to provide remote resources to the device 102, such as storing characteristics about a user's hand, writing preferences or any other information that may be useful in evaluating touch input from a user.

The device 102 may generally detect the handedness of a user by analyzing touch input on one or more touch surfaces 106 (hereinafter "the touch surface 106") of the device 102. The handedness detection may be utilized to set an inactive region on the touch surface 106 and/or to perform a variety of other operations. In one example, the device 102 may determine whether the user is right-handed or left-handed based on short-lived inputs that have recently occurred on the touch surface 106 (e.g., during a period of time leading up to the analysis). The short-lived inputs may have remained on the touch surface 106 for less than a predetermined amount of time (e.g., less than 1 or 2 seconds). In some instances, the short-lived inputs are received just before touch input is provided with an input tool 108. In other instances, the short-lived inputs may be provided while touch input is received or shortly after the input tool 108 is removed from the touch surface 106.

Additionally, or alternatively, the device 102 may set an inactive region 110 in the touch surface 106 to suppress unintentional input. The inactive region 110 may be positioned relative to a location of the input tool 108. The inactive region 110 may also be scaled and/or positioned based on contextual information related to the device 102, the input tool 108 and/or a user of the device 102, as discussed in detail herein. Touch input that is received in the inactive region 110 may generally not trigger the performance of an action, such as selecting an interface element, moving a mouse pointer, scrolling on a page and so on. Meanwhile, touch input that is received outside the inactive region 110 may cause an action to be performed. As such, the inactive region 110 may allow a user to simultaneously provide input with the input tool 108 and input with a finger or other object outside the inactive region 110. To illustrate, the user may write on the touch surface 106 with a stylus in one hand and simultaneously select an icon outside the inactive region 110 with a finger from the other hand.

The input tool 108 may comprise a stylus, pen (e.g., active pen, passive pen, ink pen, etc.), glove or any other input item that is used to provide touch input. The input tool 108 may include a tip portion to contact the touch surface 106. The tip portion may be relatively small (e.g., less than a particular size). In some instances, the input tool 108 includes processing, memory and/or communication capabilities, such as an active pen. The input tool 108 may store a unique identifier that uniquely identifies the input tool 108 and allows the input tool 108 to be associated with one or more users. The input tool 108 may communicate with another device (e.g., the device 102) via a wireless connection, such as Bluetooth®, Near field communication (NFC), Wi-Fi® and so on. In some instances, the input tool 108 is stored in the device 102 (e.g., within a storage compartment).

In one example, the input tool 108 comprises an active pen that includes a conductive tip, a sensor, processing capabilities and/or storage capabilities. For example, the active pen may include a sensor and an Application-specific Integrated Circuit (ASIC) or another component that provides information about location and/or pressure of contact to a touch surface. An active pen may also include buttons to cause operations to be performed, such as a button to erase content, a button to perform left-click or right-click operations of a mouse and so on. An active pen may also include a battery or other power source.

A touch input may be associated with physical contact. For instance, an input tool or a finger may physically touch the touch surface 106 at a particular location. A touch input may additionally, or alternatively, be associated with non-physical contact. For instance, a touch input may be detected when an input tool or a finger is detected to be located within a pre-defined or detectable distance of the touch surface 106 (e.g., in range of the touch surface 106), but may not actually be in physical contact with the touch surface 106.

The device 102 may comprise any type of computing device, such as a laptop computer, a desktop computer, a server, a smart phone, an electronic reader device, a mobile handset, a personal digital assistant (PDA), a portable navigation device, a portable gaming device, a tablet computer, a watch, a portable media player, a wearable computing device (e.g., a watch, an optical head-mounted display (OHMD), etc.), a television, a computer monitor or display, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system, a projector, an automated teller machine (ATM) and so on. In some instances, the device 102 may comprise a mobile device, while in other instances the device may be a stationary device.

As illustrated in FIG. 1, the device 102 may be equipped with one or more processors 112, memory 114 and the touch surface 106. The device 102 may also include other components discussed below in reference to FIG. 2. The one or more processors 112 may include a central processing unit (CPU), graphics processing unit (GPU), a microprocessor and so on.

The touch surface 106 may comprise any type of digitizer configured to detect touch input. The detection may be based on capacitive, optical or any other sensing techniques. The touch surface 106 may include a tactile sensor to sense touch, pressure and/or force (of an area of contact). Alternatively, or additionally, the touch surface 106 may include or be associated with a camera, microphone or another sensor (e.g., infrared sensor) to detect proximity or contact of an object. In one example, the touch surface 106 comprises a direct touch device/digitizer, such as a touch screen (electronic display), configured to display content. In another example, the touch surface 106 comprises an indirect touch device/digitizer, such as a touch pad (also known as a track pad). For a direct touch device (e.g., a touch screen), a display screen location is directly associated with touch input based on where a user touches the screen. In contrast, for an indirect touch device (e.g., a touch pad), touch input may have to be mapped or converted to a corresponding location on a display screen. Although illustrated as being included in the device 102, the touch surface 106 may comprise an external device that is connected to or otherwise associated with the device 102, such as a touch screen monitor.

As noted above, the service provider 104 may provide resources to the device 102. The service provider 104 may include one or more computing devices, such as one or more desktop computers, laptop computers, servers and so on. The one or more computing devices may be configured in a cluster, data center, cloud computing environment or a combination thereof. In one example, the one or more computing devices provide cloud computing resources, including computational resources, storage resources and the like, that operate remotely to the device 102. In one example, the service provider 104 implements a cloud-based operating system for the device 102 that provides operating system and/or other functionality to the device 102.

The service provider 104 may be equipped with one or more processors 116 and memory 118. The memory 118 may include one or more resource modules 120 (hereinafter "the resource module 120") that provide resources to the device 102. A module may represent software functionality. Further, the term "module" represents example divisions of software for purposes of discussion, and is not intended to represent any type of requirement or required method, manner or organization. Accordingly, while various "modules" are discussed herein, their functionality and/or similar functionality could be arranged differently (e.g., combined into a fewer number of modules, broken into a larger number of modules, etc.). While certain functions and modules are described herein as being implemented by modules executable by one or more processors, any or all of the modules may be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. While not illustrated in FIG. 1, the service provider 104 may also include one or more network interfaces and other components.

The resource module 120 may maintain user information in a user information data store 122 that may be useful in defining an inactive region or otherwise evaluating touch input. The user information may be associated with a user account or otherwise associated with the user. The user information may indicate:

Characteristics about a user's extremity—a size or shape of a finger, palm, hand wrist, arm, etc., which may be determined from evaluating previous touch input from the user. In some instances, size, shape and/or position is referred to as geometry.

A language of a user (e.g., a spoken or written language in which the user can communicate).

Handedness of a user—whether the user is right-handed or left-handed (e.g., writes with a left-hand or a right-hand), whether the user typically uses a right-hand or a left-hand to hold an input tool (e.g., the user users a right-hand more than a particular percentage of the time), a degree to which the user is considered to be right-handed or left-handed (e.g., a user that writes with both hands may be more comfortable with the left-hand than the right-hand) and so on.

Input behaviors—how a user has previously interacted with a touch surface (e.g., the user typically rests his palm on a touch surface right before placing a stylus on the touch surface, the user rests a finger on the touch surface while using holding an input tool with the finger, a user breaks contact with the touch surface upon finishing each word, the user holds in input tool while making a fist, the user spreads out his fingers while holding an input tool, the user frequently zooms with a pinch gesture and so on).

An input tool that is associated with a user. In some instances, an input tool may store a unique identifier that identifies the input tool. The unique identifier may be sent to the service provider 104 to associate one or more users with the input tool. As such, the service provider 104 may store the unique identifier for the input tool.

Any other information.

In one implementation, the device 102 may communicate with the service provider 104 to identify information about a user that is using the input tool 108. Here, the device 102 may obtain a unique identifier from the input tool 108 and send the unique identifier to the service provider 104. The service provider 104 may identify a user that is associated with the unique identifier and user information that is associated with the user (e.g., handedness, extremity characteristics, language, etc.). The service provider 104 may send the information to the device 102 so that the device 102 may define an inactive region in the touch surface 106, where touch input may be suppressed. Although in this example, the user information is provided to the device 102, in other instances information about a size, shape and/or position for an inactive region may be sent to the device 102. That is, the service provider 104 may determine an appropriate inactive region and instruct the device 102 to form such inactive region.

Although in the example architecture 100 of FIG. 1 the resource module 120 is illustrated as being included in the service provider 104, any of the functionality performed by the resource module 120 may be performed locally at the device 102. As such, in some instances the service provider 104 may be eliminated.

The memory 114 and/or 118 may include one or a combination of computer-readable media. Computer-readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

The device 102 and service provider 104 may communicate via one or more networks 124. The one or more networks 124 may include any one or combination of multiple different types of networks, such as cellular networks, wireless networks, Local Area Networks (LANs), Wide Area Networks (WANs), Personal Area Networks (PANs), and the Internet.

Example Device

Figure 2:
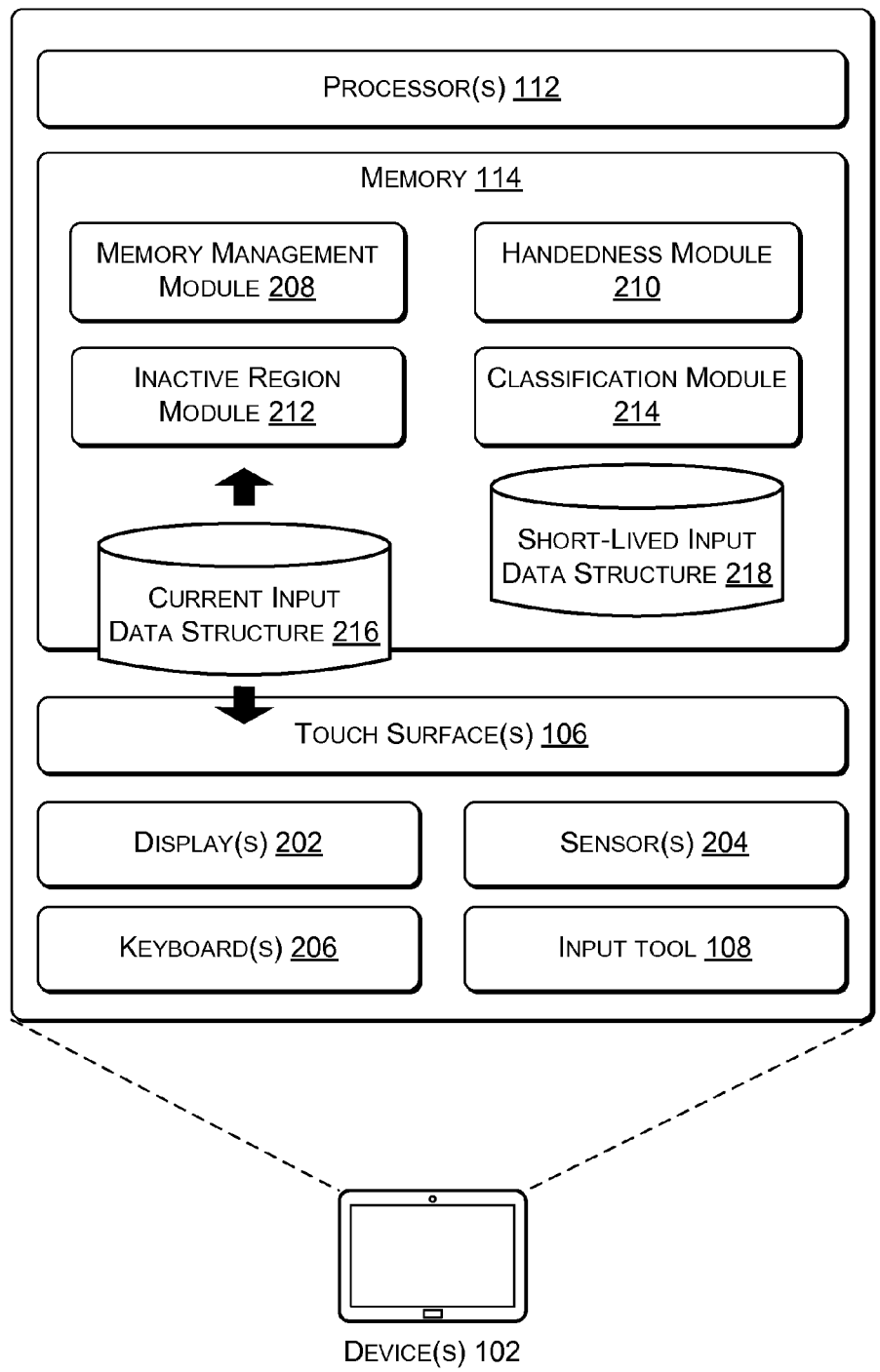
FIG. 2 illustrates details for an example device of FIG. 1.

FIG. 2 illustrates details for the example device 102 of FIG. 1. As illustrated in FIG. 2, in addition to the one or more processors 112, the memory 114 and the touch surface 106, the device 102 may include one or more displays 202, one or more sensors 204, one or more keyboards 206 and the input tool 108. The one or more displays 202 may include a Liquid-crystal Display (LCD), a Light-emitting Diode (LED) display, an organic LED display, a plasma display, an electronic paper display or any other type of technology. When the touch surface 106 is implemented as a touch screen, the one or more displays 202 may be integrated into the touch surface 106.

The one or more sensors 204 may include a proximity sensor that detects a proximity of objects to the device 102 (e.g., a sensor that detects a user gripping the device 102), an infrared (IR)/thermal sensor, a Wi-Fi® sensor, a camera, a microphone, an accelerometer, a compass, a gyroscope, a magnetometer, a Global Positioning System (GPS), a depth sensor, an olfactory sensor (e.g., for smell) or other sensor. In some instances, the one or more sensors 204 may act to detect proximity of an object to the device 102 (e.g., by analyzing video or audio of objects that are in proximity to the device).

In some instances, the one or more keyboards 206 include a set of mechanical or pressure-sensitive buttons, while in other instances the one or more keyboards 206 may be implemented through a touch screen or other type of touch surface (e.g., the touch surface 106). In some instances, the input tool 108 is connected to, stored in or otherwise included as part of the device 102, while in other instances the input tool 108 may be detached from the device 102. The device 102 may also include or be associated with one or more network interfaces or other components.

The memory 114 may store modules to implement functionality. As illustrated, the memory 114 may store a memory management module 208, a handedness module 210, an inactive region module 212 and a classification module 214. In some instances, the modules 208-214 are implemented as part of an operating system. In other instances, the modules 208-214 are implemented as part of a device driver (e.g., a driver for a touch surface), firmware, an application (e.g., mobile application) and so on. Although techniques are discussed as being implemented by the modules 208-212, in some instances the techniques are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The memory management module 208 may manage data for touch input that is stored in the memory 114. In some instances, as touch input is detected on the touch surface 106, data describing the touch input (e.g., location, pressure, size, shape, etc.) may be stored in a current input data structure 216 (first data structure). The current input data structure 216 may be implemented in memory of the touch surface 106 and/or the memory 114. The current input data structure 216 may store data for the touch input while the touch input remains on the touch surface 106. When the touch input is removed from the touch surface 106 (e.g., contact is no longer provided), the memory management module 208 may determine if the touch input remained on the touch surface 106 for less than a predetermined amount of time (e.g., less than 1 or 2 seconds). If so, then data for the touch input may be stored in a short-lived input data structure 218 (second data structure). The data for the touch input may be deleted from the current input data structure 216 once the touch input is no longer on the touch surface 106. The short-lived input data structure 218 may generally be implemented in the memory 114, although in some instances memory of the touch surface 106 may be used.

The memory management module 208 may maintain data in the short-lived input data structure 218 for a predetermined period of time (e.g., 2 or 3 seconds). As such, the short-lived input data structure 218 may include data for recent short-lived touch input. Upon expiration of the predetermined period of time, the data for a touch input may be deleted from the short-lived input data structure 218. This same process of storing data in the current input data structure 216 and, if appropriate, storing data in the short-lived input data structure 218, may be performed for each touch input that is received. The predetermined amount of time and/or the predetermined period of time that is used by the memory management module 208 to store data for touch input may be configured by a user, an application or a platform.

The handedness module 210 may analyze touch input to determine a handedness of a user (e.g., a hand that the user is currently writing with on the touch surface 106). The handedness module 210 may generally seek to identify touch inputs that are related to a palm of the user. Once the touch inputs of the palm are identified, the handedness of the user may be determined based on which side of the input tool 108 the touch inputs are located. In many examples, handedness detection may be begin as soon as the input tool 108 is detected to be within range of the touch surface 106 (e.g., detect a signal from an active pen), even if the input tool 108 has not yet made contact with the touch surface 106. This may allow the handedness to be detected when the input tool 108 hovers over the touch surface 106.

In many instances, the handedness module 210 may analyze short-lived inputs that have been recently received via the touch surface 106. That is, the handedness module 210 may analyze data for touch inputs that is stored in the short-lived data structure 218. The short-lived inputs may have remained on the touch surface for less than a predetermined amount of time (e.g., 1 or 2 seconds). The handedness module 210 may analyze a location of the short-lived inputs relative to each other and a touch input from the input tool 108. For example, if the short-lived inputs are clustered on the right side of touch input from the input tool 108, then it may be determined that the user is right-handed. In another example, the handedness module 210 may calculate a ratio of a number of short-lived inputs on the right side of the input tool 108 to a number of short-lived inputs on the left side of the input tool 108. If, for example, the ratio is greater than 2:1 (e.g., more than twice as many touch inputs are on the right side), then it may be determined that the user is right-handed.

The handedness module 210 may generally classify touch inputs that are more than a predetermined distance from the input tool 108 as intentional (e.g., more than 10 cm or more than a width of a typical palm). In many instances, touch input that is received outside this distance is associated with intentional input from a hand of the user that is not currently holding the input tool 108. Such intentional input may be excluded from touch inputs that are associated with the palm. Thus, an intentional input may be excluded when determining a ratio of touch inputs on the right side of the input tool 108 in comparison to the left side of the input tool 108, for example.

The inactive region module 212 may define an inactive region in the touch surface 106. The inactive region may allow unintentional input that is from a user's palm or finger to be suppressed (e.g., disregarded or ignored). The inactive region may have a variety of characteristics (e.g., sizes, shapes and/or positions) based on where unintentional input is detected or predicted to occur. The inactive region may generally be positioned based on touch input from the input tool 108 (e.g., set in close proximity to the input tool 108, set around the input tool 108, etc.). The inactive region may also be defined based on contextual information related to the user and/or the touch surface 106. The contextual information may indicate:

- A geometry of the touch surface 106—a size, shape and/or position of the touch surface 106. The position of the touch surface 106 may be relative to an enclosure of the device 102 (e.g., a touch screen is offset to the right of the enclosure). The size and/or shape of the inactive region may be scaled to a size and/or shape of the touch surface 106. In one example, if the size of a touch surface is relatively large, then a relatively large inactive region may be defined in comparison to a touch surface that is smaller in size.
- A geometry of a touch input on the touch surface 106—a size, shape and/or position of the touch input. The size and/or shape of the inactive region may be scaled to a size and/or shape of the touch input. In one example, if a touch input is relatively circular, then a circular inactive region may be defined. In another example, if a touch input (assumed to originate from a palm) is relatively large, then the inactive region may be defined to be relatively large and centered on the touch input to encompass the touch input.

A direction of travel and/or velocity of a touch input from the input tool and/or from the user. In one example, a size of the inactive region may increase as the velocity of a touch input increases.

A number of users that are interacting with the touch surface 106. In one example, if it is detected that there are multiple input tools interacting with the touch surface (indicating multiple users), then multiple inactive regions may be created. Each of the inactive regions may be smaller than they would ordinarily be without multiple users, in order to provide sufficient space on the touch surface 106 for the users to provide input.

Information about an application that is currently running on the device 102. The information may indicate a type of application that is currently being implemented and/or content that is displayed by the application via the touch surface 106. In one example, if a writing application is running that allows a user to write on the touch surface 106, then a larger inactive region may be created in comparison to an inactive region that is created for a music application that is running, since the user is more likely to unintentionally contact the touch surface 106 while writing. In some instances, an application may include a setting indicating whether or not an inactive region may be used while the application is running An orientation of the device 102 (e.g., an angular position). The device 102 (and/or the touch surface 106) may be oriented in a landscape mode, portrait mode, lying horizontally (e.g., on a table), standing vertically (e.g., hanging on a wall), at a particular angle (e.g., 45 degrees) and so on. In one example, the inactive region includes first characteristics (size, shape and position) when the device 102 is oriented in a first orientation (e.g., horizontally) and includes second characteristics when the device 102 is oriented in a second orientation (e.g., vertically). To illustrate, when the device 102 is resting on a table, the inactive region may extend further below the input tool 108 than when the device 102 is hanging on a wall, since the user is more likely to inadvertently rest a wrist on the touch surface 106 when the device 102 is laying horizontally on the table.

Any user information associated with a user that is using the device 102 (e.g., characteristics about the user's hand, a language of the user, a handedness of the user, input behaviors, an input tool associated with the user and so on). In one example, if it is detected that the user is using a right-hand, then the inactive region may extend toward a right side of the input tool 108. In another example, for a user that writes in English, which is written from left to right, the inactive region may extend further to the right of the input tool 108 than an inactive region for another user that writes in a language that is written from right to left. In yet another example, an inactive region may be scaled to a size of the user's palm, which is identified by analyzing previous touch input from the user or otherwise identified. Further, if it is determined from previous input behavior that a user unintentionally rests a middle finger of a hand that is holding the input tool 108 above the input tool 108, then the inactive region may extend above the input tool 108 to encompass the touch input from the middle finger.

Any other information.

The inactive region module 212 may establish an inactive region from a combination of different pieces of contextual information or from a single piece of contextual information. In some examples, a rule-based approach is taken, where a rule is defined for one or more pieces of contextual information. To illustrate, the inactive region may be scaled to a particular size if a touch input assumed to originate from a palm is larger than a threshold size. In other examples, a weighting-based approach is taken, where each piece of contextual information is associated with a variable and weighted based on a degree of relatedness to unintentional input. To illustrate, a function may be formed that includes a variable for a size of a touch input and a variable for a velocity of the touch input. Each of the variables may be weighted and summed together (e.g., function=constant$_1$×variable$_1$+constant$_2$×variable$_2$). The resulting value of the function may be used to scale a size of an inactive region (e.g., as the value increases, the size of the inactive region increases).

The inactive region module 212 may update characteristics of an inactive region as the input tool 108 moves and/or as contextual information changes. The inactive region may generally follow the location of the input tool 108 (e.g., the inactive region may maintain relation to the input tool 108). Further, a size or shape of the inactive region may adapt to contextual information. To illustrate, the inactive region may increase in size as a touch input that is believed to be a palm increases in size (e.g., the user contacts the touch surface 108 with more area of the user's palm).

In some instances, the inactive region module 212 may maintain the inactive region on the touch surface 106 in the absence of touch input from the input tool 108. If, for example, it is detected that the input tool 108 is removed from the touch surface 106, but touch input is still being provided in an inactive region, then the inactive region may be maintained on the touch surface 106 until touch input in the inactive region is removed. This may be useful in situations where a user lifts a stylus between writing sentences or otherwise removes the stylus for a period of time while the user's palm continues to rest on the touch surface 106. Additionally, or alternatively, the inactive region module 212 may maintain the inactive region a predetermined period of time after the input tool 108 has been removed from the touch surface 106 and touch input from the user is no longer detected in the inactive region. This may allow a user to completely remove a hand and stylus from the touch surface 106 and return to writing.

The classification module 214 may generally classify touch input that is received in an inactive region as unintentional. When touch input is classified as unintentional, it may be suppressed (e.g., disregarded). That is, an action that may ordinarily be performed for the touch input may not be performed. As such, processing for the touch input may be disabled. However, in some instances a touch input that is received in the inactive region may be classified as intentional and processing may be performed for the touch input (e.g., processing may be selectively enabled). Here, the normal classification of unintentional may be overridden when certain criteria are satisfied. For instance, the classification module 214 may classify a touch input that is received in the inactive region as intentional if it is determined that a velocity of the touch input satisfies a velocity criterion (e.g., is slower than a particular velocity at which the input tool 108 is traveling, which may indicate that the touch input originates from a non-writing hand and is intentional). Additionally, or alternatively, the direction of travel of the touch input may be analyzed to determine if the direction is in particular direction (e.g., in an opposite direction to a direction of travel of the input tool 108, which may indicate that the touch input originates from a non-writing hand and is intentional). Further, if the distance traveled by the touch input is greater than a predetermined distance (or less than a predetermined distance in some instances), then the touch input may be classified as intentional. Moreover, multiple touch inputs that are received in the inactive region may be classified as intentional if a number of the touch inputs satisfies a number criterion (e.g., more than a particular number). To illustrate, if there are two touch inputs that are received in the inactive region and they move closer to each other in a pinching motion, then the touch inputs may be evaluated as being associated with a zoom function and classified as intentional.

Example Handedness Detection

Figure 3:
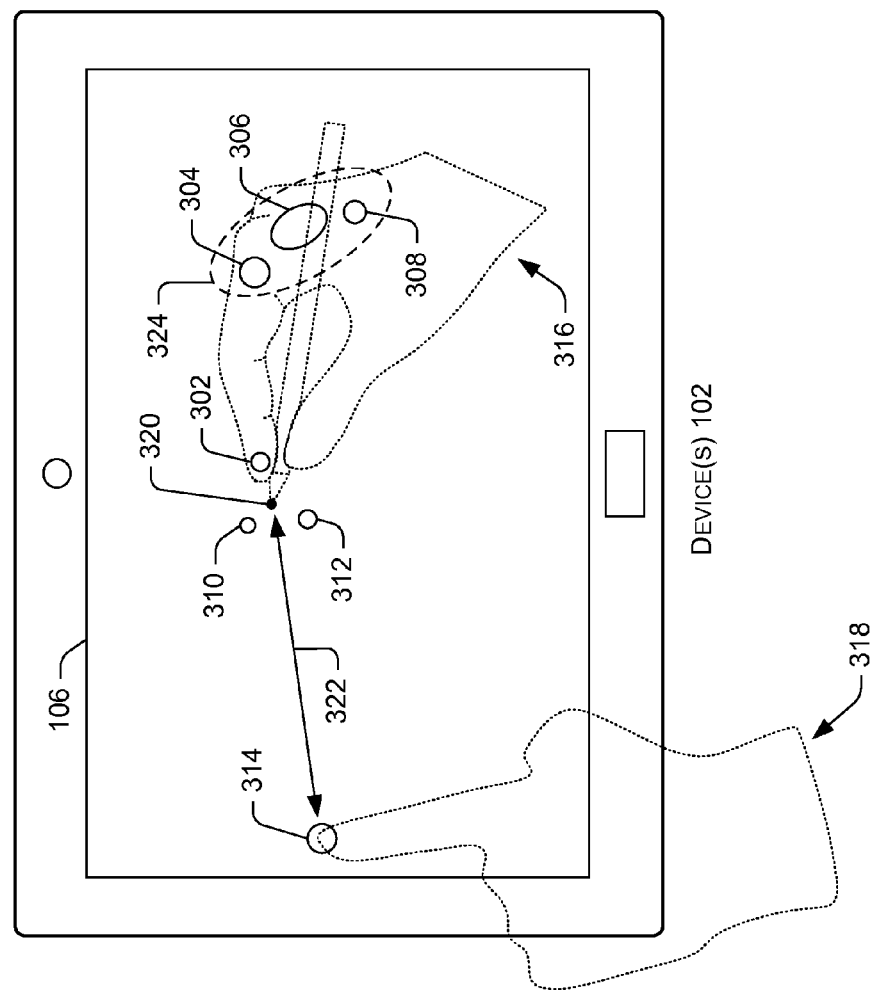
FIG. 3 illustrates example techniques for detecting a handedness of a user.

FIG. 3 illustrates example techniques for detecting a handedness of a user (e.g., a hand of the user that is currently using an input tool). In this example, the techniques may analyze short-lived inputs 302-314 that have recently occurred on the touch surface 106 as an input tool is used. For example, one or more of the short-lived inputs 302-314 are removed from the touch surface 106 during a period of time leading up to a time when the handedness detection is performed. The short-lived inputs 302-314 may be provided by a user's hand. In this example, the short lived inputs 302-312 are provided by the user's right-hand 316, while the short-lived input 314 is provided by the user's left-hand 318. Although the user's right-hand 316 is not illustrated as covering the short-lived inputs 310 and 312, these inputs originate from the user's fingers that are holding the input tool (e.g., fingers of the user's right-hand 316). As illustrated, a tool input 320 shows where touch input is received from the input tool.

The handedness detection may initially determine whether any of the short-lived inputs 302-314 are located more than a distance 322 from the tool input 318. As illustrated, the short-lived input 314 is located more than the distance 322. Accordingly, the short-lived input 314 is classified as an intentional input and is disregarded from the rest of the handedness detection. The distance 322 may be set to a value that is determined to be larger than a user's palm. This initial classification may allow touch input that is outside the user's typical area where palm input may be received to be disregarded from the handedness detection.

The techniques may analyze the remaining short-lived inputs 302-312 to determine whether the user is using a right-hand or a left-hand. The techniques analyze locations of the short-lived inputs 302-312 relative to each other and to the tool input 320. Here, it is determined that the short-lived inputs 304, 306 and 308 are clustered together within an area 324 on a right side of the tool input 320. A cluster may be identified when inputs are located within a predetermined distance to each other (e.g., each input is located within a predetermined distance to at least one other input, all inputs are located within a predefined area centered on a point and so on). Further, it may be determined that there are more short-lived inputs on a right side of the tool input 320 than a left side of the tool input 320. In particular, a ratio of a number of right side short-lived inputs to a number of left side inputs (excluding the short-lived input 314) is 4:2. Since there are at least double the number of short-lived inputs on the right side, and in view of the clustered short-lived inputs in the area 324, it may be determined that the user is employing a right-hand to hold the input tool.

Example Inactive Regions

FIGS. 4A, 4B, 4C and 4D illustrate example inactive regions 402, 404, 406 and 408, respectively, that may be used to suppress touch input. The inactive regions 402, 404, 406 and 408 are each positioned in the touch surface 106 relative to touch input from an input tool, such as the input tool 108. Although the inactive regions 402, 404, 406 and 408 are illustrated as surrounding touch input from an input tool (labeled as tool input), the touch input from the input tool may not be encompassed. Further, although the inactive regions 402, 404, 406 and 408 are illustrated with particular shapes, any shape may be used, such as any type of polygon, ellipse, shape with curved lines and so on.

Figure 4A:
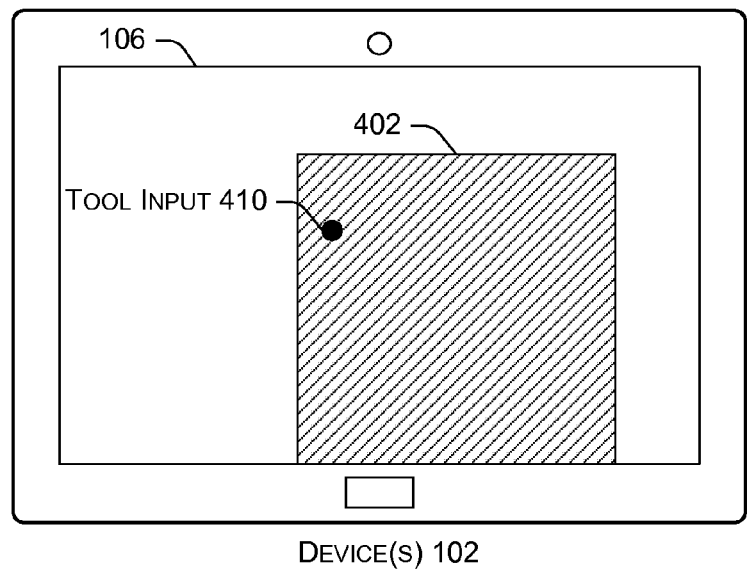
FIGS. 4A, 4B, 4C and 4D illustrate example inactive regions that may be used to suppress touch input.

FIG. 4A illustrates the example inactive region 402 for a right-handed user. The inactive region 402 may extend a predetermined distance from tool input 410 in each direction (e.g., up, down, right and left). In one example, the inactive region 402 extends 5 mm to a left side of the tool input 410. Since right-handed users have a majority of their hands below and to the right of the tool input 410, the inactive region 402 includes more area toward a lower right-hand corner of the touch surface 106 than the upper left-hand corner. As illustrated, the inactive region 402 may surround the tool input 410.

Figure 4B:
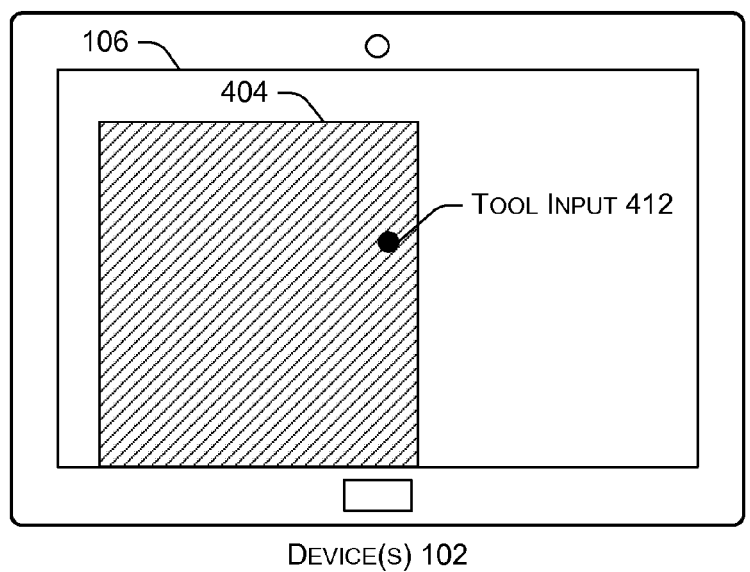

FIG. 4B illustrates the example inactive region 404 for a left-handed user. The inactive region 404 may extend a predetermined distance from tool input 412 in each direction (e.g., up, down, right and left). As illustrated, the inactive region 404 may extend further upward from the tool input 412 than the inactive region 402 extends upward from the tool input 410. This may account for typical writing characteristics of left-handed users, such as writing with a larger portion of the hand above an input tool than right-handed users (e.g., a left-handed user curves a writing hand more inward toward the user's body than a right-handed user).

Figure 4C:
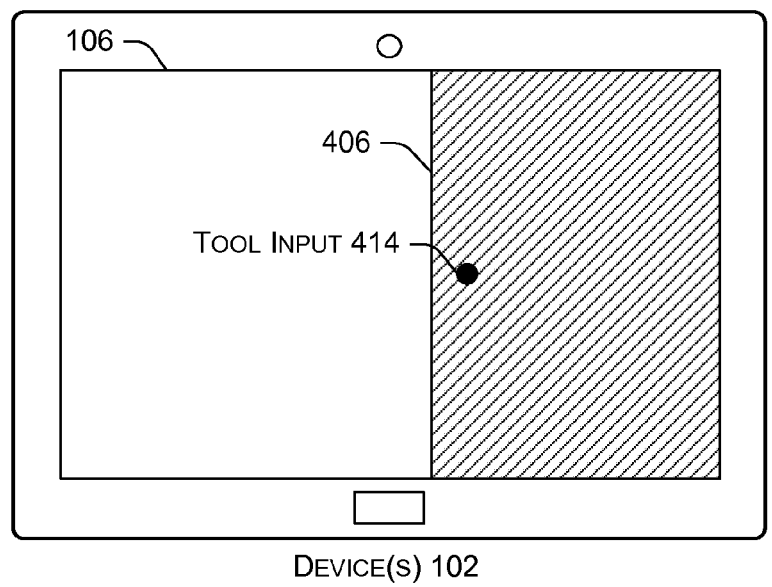

FIG. 4C illustrates the example inactive region 406 that extends to a top edge of the touch surface 106 and to a bottom edge of the touch surface 106. The inactive region 406 also extends to a right edge of the touch surface 106, even when the tool input 414 is located on a left side of the touch surface 106. Again, the inactive region 406 may be positioned relative to tool input 414. In this example, the inactive region 406 may include substantially half of the touch surface 106, since the tool input 414 is located close to the middle of the touch surface 106. The inactive region 406 may generally be provided for a right-handed user. Although not illustrate, an inactive region for a left-handed user that includes similar characteristics as the inactive region 406 may be a flipped version of the inactive region 406. That is, the left-handed inactive region may extend to a top edge and a bottom edge of the touch surface 106 and extend to a left edge of the touch surface 106, while encompassing the tool input 414.

Figure 4D:
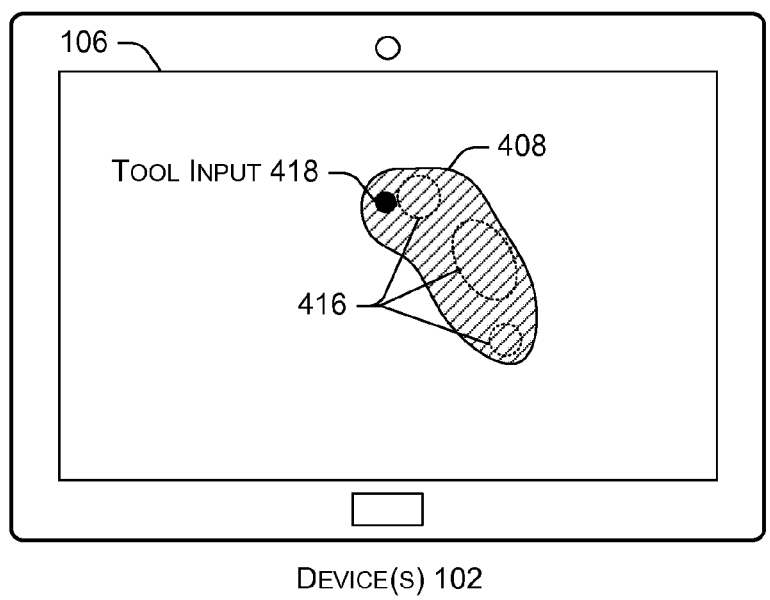

FIG. 4D illustrates the example inactive region 408 that is shaped to touch inputs 416 that are received from a user via the touch surface 106. In particular, the inactive region 408 generally outlines the touch inputs 416. The touch inputs 416 may be provided by a user's palm as the user writes with an input tool. As such, the inactive region 408 may be scaled to the user's palm. The inactive region 408 surrounds tool input 418 in this example, so that inadvertent input from the user's fingers that are holding the inputs tool may be suppressed.

FIG. 5 illustrates example inactive regions 502 and 504 that may be used when multiple users are interacting with the device 102. The separate inactive regions 502 and 504 may be defined when it is detected that multiple input tools are in use. As illustrated, the inactive region 502 is oriented to a hand 506 from a first user and tool input 508, while the inactive region 504 is oriented to a hand 510 of a second user and tool input 512. In this example, the device 102 is positioned flat on a table and the first user is facing the second user across the table. The inactive region 502 is defined based on information that is associated with the first user, while the inactive region 504 is defined based on information that is associated with the second user. In this example, based on an analysis of previous touch input, it is determined that the first user tends to rest a knuckle of the user's littler finger on a touch surface when writing, and the second user tends to rest a wrist on a touch surface when writing. Accordingly, the inactive region 504 is defined to be larger in size than the inactive region 502 to account for unintentional input from the second user's wrist, and given that the first user has not exhibited such behavior.

FIG. 6 illustrates an example inactive region 602 that is defined based on information about an application that is running on the device 102. In this example, a user is using a writing application 604 on the device 102, such as an application to take notes or otherwise write on the touch surface 106 with a stylus. As illustrated, the inactive region 602 extends from tool input 606 to a bottom edge of the touch surface 106. In addition, based on information about the writing application 604, it may be determined that an icon bar 608 is currently being displayed with a plurality of selectable icons to facilitate functionality in the writing application 604. Accordingly, the inactive region 602 is defined around the icon bar 608, as illustrated by the icon bar 608 covering the inactive region 602. This may allow the user to select any of the icons on the icon bar 608.

Example Processes

Figure 7:
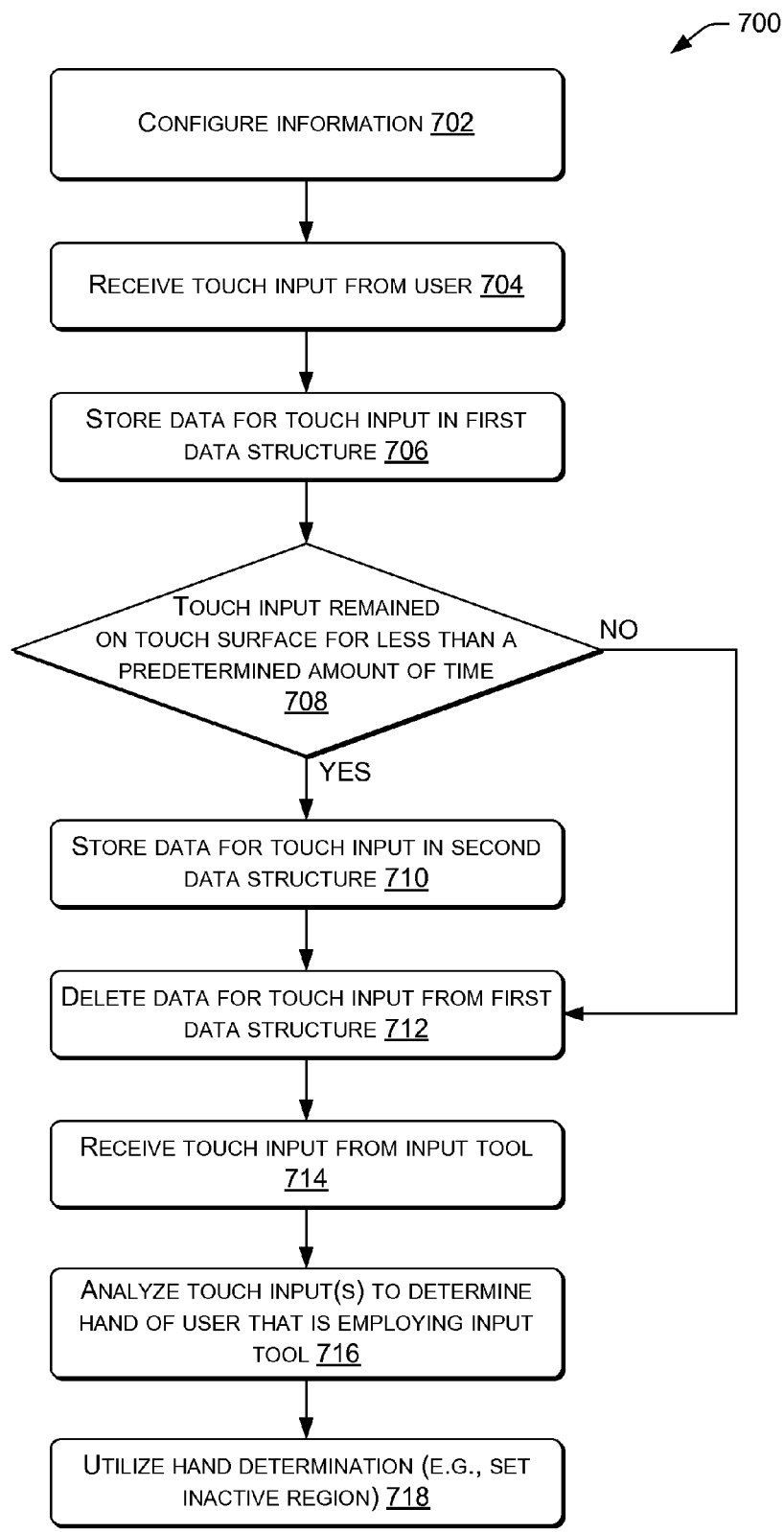
FIG. 7 illustrates an example process to determine a hand of a user that is using an input tool based on short-lived touch inputs.
Figure 8:
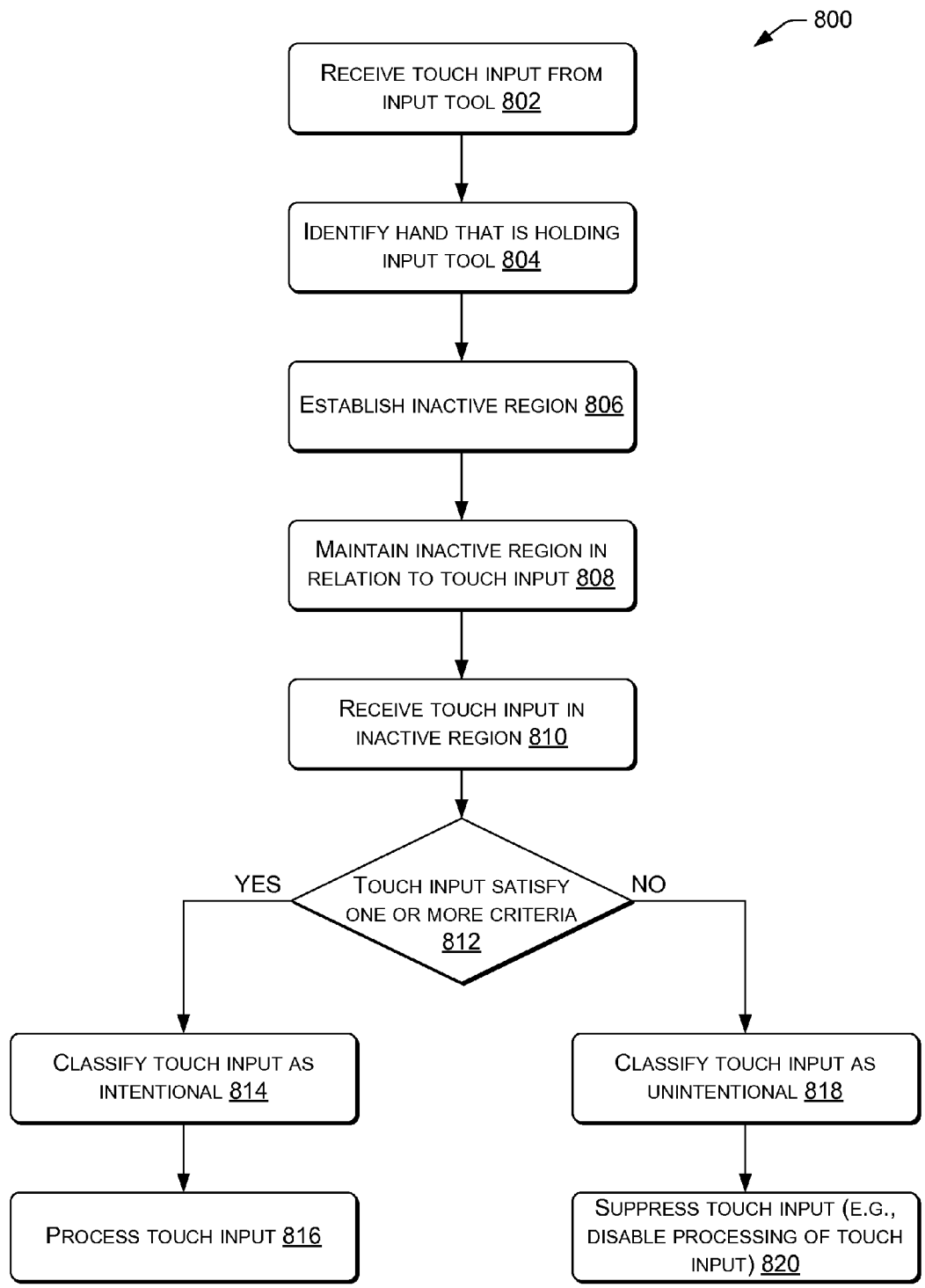
FIG. 8 illustrates an example process to establish an inactive region in a touch surface to suppress touch input.
Figure 9:
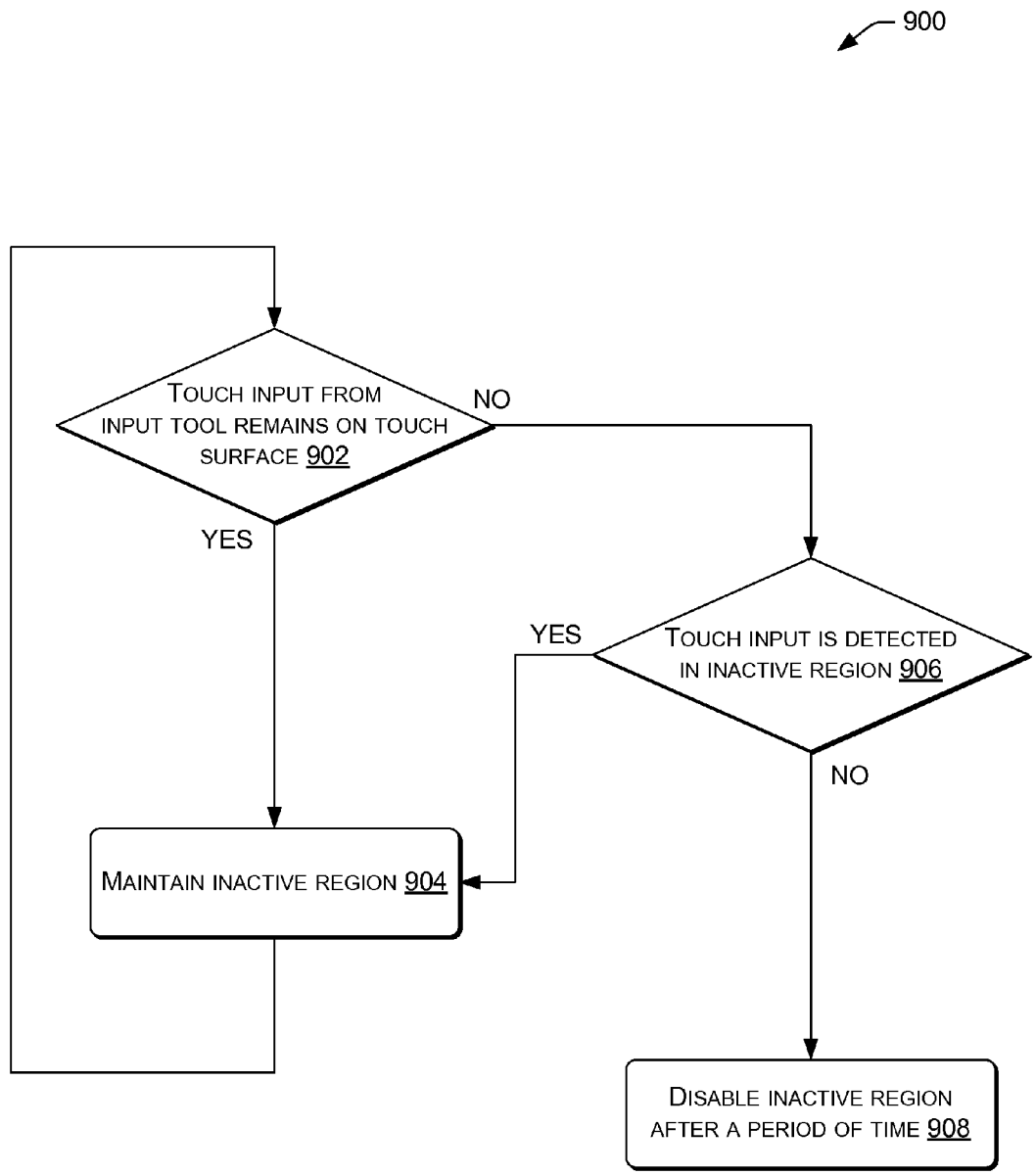
FIG. 9 illustrates an example process to selectively disable an inactive region.

FIGS. 7, 8 and 9 illustrate example processes 700, 800 and 900 for employing the techniques described herein. For ease of illustration the processes 700, 800 and 900 are described as being performed in the architecture 100 of FIG. 1. For example, one or more of the individual operations of the processes 700, 800 and 900 may be performed by the device 102. However, the processes 700, 800 and 900 may be performed in other architectures. Moreover, the architecture 100 may be used to perform other processes.

The processes 700, 800 and 900 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIG. 7 illustrates the example process 700 to determine a hand of a user that is using an input tool based on short-lived touch inputs.

At 702, the device 102 may configure information, such as an amount of time for classifying a touch input as a short-lived input (e.g., 2 seconds) and/or a period of time to maintain a touch input in memory (e.g., in a secondary data structure). In some instances, a user may be prompted to perform a specific task on the device 102, such as writing a number of sentences, contacting the touch surface 106 with an input tool in a normal fashion to write and removing the input tool and so on. The device 102 may gather information about the task, such as an average time from receiving a palm contact to receiving an input tool contact, an average amount of time that a palm contact remains on the touch surface 106 and so on. Based on this information, an amount of time for classifying a touch input as a short-lived input and/or a period of time to maintain a touch input in memory may be configured. Further, in some instances the amount of time and/or period of time may be configured by a user from user input specifying the amount of time and/or period of time. The operation 702 may be performed when a user begins to use the device 102, such as on start-up or when opening a writing application, or at any other time.

At 704, the device 102 may receive touch input from a user, such as from the user's palm or finger. The touch input may be received via the touch surface 106. At 706, the device 102 may store data for the touch input in a first data structure. The data may be stored in the first data structure while the touch input remains on the touch surface 106.

When it is detected that the touch input is removed from the touch surface 106 (e.g., is not in contact or range of the touch surface 106), the device 102 may, at 708, determine whether the touch input remained on the touch surface 106 for less than a predetermined amount of time (e.g., is a short-lived input). The predetermined amount of time may be configured by a user, an application, a platform (e.g., operating system) and/or by prompting the user to perform a task. If it is determined that the touch input remained on the touch surface 106 for less than the predetermined amount of time, the process 700 may proceed to operation 710. Alternatively, if it is determined that the touch input did not remain on the touch surface 106 for less than the predetermined amount of time, the process 700 may proceed to operation 712.

At 710, the device 102 may store data for the touch input in a second data store for a predetermined amount of time. At 712, the device 102 may delete the data for the touch input from the first data structure.

At 714, the device 102 may receive touch input from the input tool 108. The touch input may be received via the touch surface 106. Although the operation 714 is illustrated as being performed after the operation 712, the operation 714 may be performed at any time. In some instances, the touch input from the input tool 108 is received at a same time or before receiving touch input from a user at 704.

At 716, the device 102 may analyze one or more touch inputs, for which data is stored in the second data structure, to determine a hand of the user that is employing the input tool 108. The analysis may generally determine whether the touch inputs are clustered together, located on a particular side of the touch surface 106 relative to the input tool 108, located within a particular distance to the input tool 108 and so on. In some instances, the analysis may calculate a value (e.g., a ratio) representing a number of touch inputs on one side of the input tool 108 relative to a number of touch inputs on another side of the input tool 108. Further, in some instances the analysis may make an initial determination as to whether or not a touch input is intentional based on whether or not the touch input is within a predetermined distance to the input tool 108. Touch input may be classified as intentional if it is located outside the predetermined distance. The intentional input may not be used for the rest of the hand detection.

At 718, the device 102 may utilize the hand determination from operation 716 to, for example, set an inactive region in the touch surface 106 and/or perform a variety of other operations.

FIG. 8 illustrates the example process 800 to establish an inactive region on a touch surface to suppress touch input.

At 802, the device 102 may receive touch input from the input tool 108. The touch input may be received via the touch surface 106. The input tool 108 may comprise a stylus or another input object.

At 804, the device 102 may identify a hand of a user that is holding the input tool 108. In some instances, this may include performing the process 700 of FIG. 7, while in other instances the hand of the user may be identified through other techniques.

At 806, the device 102 may establish an inactive region in the touch surface 106. That is, the device 102 may define a region in the touch surface 106 that will generally be associated with unintentional input. The inactive region may be established based on a location of the input tool 108 and/or contextual information related to the user and/or the device 102. The contextual information may indicate a geometry of the touch surface 106, a geometry of touch input from the user, a direction of travel and/or velocity of touch input, a number of users that are interacting with the touch surface 106, information about an application that is currently running on the device 102, an orientation of the touch surface 106, a language of the user or a variety of other information. In one example, a unique identifier is obtained from the input tool 108 and provided to the service provider 104 to obtain user information, such as a preference for the user, a characteristic about an extremity of the user, a handedness of the user, a language of the user and so on.

At 808, the device 102 may maintain the inactive region in relation to touch input from the input tool 108. In other words, the inactive region may change positions as the input tool 108 changes position on the touch surface 106.

At 810, the device 102 may receive touch input in the inactive region. The touch input may be received from a user's hand or another item. At 812, the device 102 may determine whether the touch input satisfies one or more criteria. In some instances, a touch input may be intentional even though it is within the inactive region. Accordingly, the determination at 812 may identify those touch inputs that are actually intentional and, thus, should not be suppressed from processing. For example, the device 102 may determine if a velocity of the touch input satisfies a velocity criterion, a direction of travel of the touch input is in particular direction, a number of touch inputs satisfies a number criterion and so on.

If it is determined that touch input satisfies the one or more criteria at 812, the process 800 may proceed to 814 to classify the touch input as intentional and then to 816 to process the touch input (e.g., cause an action to be performed for the touch input). Alternatively, if it is determined that the touch input does not satisfy the one or more criteria at 812, the process 800 may proceed to 818 to classify the touch input as unintentional and then to 820 to suppress the touch input (e.g., disable processing of the touch input—refrain from performing an action for the touch input).

In some instances, the process 800 may be performed for each touch input that is received from the input tool 108, such as in the case where multiple users are using the device 102. As such, multiple inactive regions may be created in the touch surface 106 to suppress unintentional input, such as input from a palm. Each inactive region may be based on information about a user for which the inactive region is created, such as a preference for the user, a characteristic about an extremity of the user, a handedness of the user, a language of the user and so on.

FIG. 9 illustrates the example process 900 to selectively disable an inactive region. In some instances, the process 900 may be performed in parallel to the process 800 after an inactive region has been established (e.g., after the operation 806 is performed).

At 902, the device 102 may determine whether touch input from the input tool 108 remains on the touch surface 106 (e.g., in contact with or in range of the touch surface 106). If it is determined that the touch input from the input tool 108 remains on the touch surface 106, the process 900 may proceed to operation 904 to maintain the inactive region on the touch surface 106. Alternatively, if it is determined that the touch input from the input tool 108 does not remain on the touch surface 106 (has been removed), the process 900 may proceed to operation 906.

At 906, the device 102 may determine whether touch input is detected in the inactive region (e.g., a touch input remains in the inactive region). If it is determined that touch input is detected in the inactive region, the process 900 may proceed to 904 to maintain the inactive region. If it is determined that touch input is not detected in the inactive region, the process 900 may proceed to 908 to disable the inactive region after a period of time (e.g., after the expiration of a period of time).

Examples

Example A, a method comprising: receiving, by a computing device, one or more touch inputs from a user via a touch surface; receiving, by the computing device, a touch input from an input tool via the touch surface; determining, by the computing device, that each of the one or more touch inputs from the user remained on the touch surface for less than a predetermined amount of time; and analyzing the one or more touch inputs from the user to determine whether the user is employing the input tool with a left-hand or a right-hand, the analyzing being based at least in part on one or more locations of the one or more touch inputs from the user on the touch surface relative to a location of the touch input from the input tool on the touch surface.

Example B, the method of example A, wherein the one or more touch inputs from the user comprise one or more recent touch inputs received during a period of time lead up to a time when the analyzing is performed, the period of time being less than a predetermined period of time.

Example C, the method of any of examples A or B, wherein the input tool comprises at least one of a stylus or another input item.

Example D, the method of any of examples A-C, wherein the analyzing includes: determining that the one or more locations of the one or more touch inputs from the user are clustered together on the touch surface within a particular proximity to each other; identifying a side of the touch input from the input tool where the one or more locations of the one or more touch inputs from the user are clustered together; and determining whether the user is employing the input tool with a left-hand or a right-hand based at least in part on the identified side.

Example E, the method of any of examples A-D, wherein the analyzing includes: determining that more touch inputs from the user are received on a particular side of the touch input from the input tool in comparison to another side of the touch input from the input tool; and determining whether the user is employing the input tool with a left-hand or a right-hand based at least in part on the particular side.

Example F, the method of any of examples A-E, wherein the analyzing includes: determining that a location of a particular touch input, from among the one or more touch inputs from the user, on the touch surface is within a predetermined proximity to a location of the touch input from the input tool on the touch surface; classifying the particular touch input as unintentional; and utilizing the particular touch input to determine whether the user is employing the input tool with a left-hand or a right-hand.

Example G, the method of any of examples A-F, wherein the analyzing includes: determining that a location of a particular touch input, from among the one or more touch inputs from the user, on the touch surface is outside a predetermined proximity to a location of the touch input from the input tool on the touch surface; classifying the particular touch input as intentional; and utilizing another touch input of the one or more touch inputs from the user to determine whether the user is employing the input tool with a left-hand or a right-hand.

Example H, a system comprising: a touch surface to receive (i) multiple user touch inputs from a user and (ii) tool touch input from an input tool, each of the multiple user touch inputs remaining on the touch surface for less than a predetermined amount of time; one or more processors communicatively coupled to the touch surface; memory communicatively coupled to the one or more processors and configured to store data for each of the multiple user touch inputs for a predetermined period of time; and a handedness module executable by the one or more processors to: based at least in part on the data in the memory, calculate a value representing (i) a number of user touch inputs on one side of the tool touch input relative to (ii) a number of user touch inputs on another side of the tool touch input; and utilize the value to determine whether the user is employing the input tool with a left-hand or a right-hand.

Example I, the system of example H, wherein the value comprises a ratio of (i) the number of user touch inputs on the one side of the tool touch input to (ii) the number of user touch inputs on the other side of the tool touch input.

Example J, the system of any of examples H or I, wherein the handedness module is configured to utilize the value to determine whether the user is employing the input tool with a left-hand or a right-hand by: determining that the ratio is greater than a predetermined ratio; and in response to determining that the ratio is greater than a predetermined ratio, determining whether the user is employing the input tool with a left-hand or a right-hand based at least in part on the ratio.

Example K, the system of any of examples H-J, further comprising a memory management module executable by the one or more processors to: determine that a user touch input of the multiple user touch inputs remained on the touch surface for less than the predetermined amount of time; in response to determining that the user touch input of the multiple user touch inputs remained on the touch surface for less than the predetermined amount of time, cause data for the user touch input to be stored in the memory for the predetermined period of time; and in response to expiration of the predetermined period of time, cause the data for the user touch input to be deleted from the memory.

Example L, the system of any of examples H-K, wherein the handedness module is configured to: determine that at least some of the multiple user touch inputs are received on the touch surface within a particular proximity to each other; and utilize a location of the at least some of the multiple user touch inputs to determine whether the user is employing the input tool with a left-hand or a right-hand.

Example M, the system of any of examples H-L, wherein at least one of the predetermined amount of time or the predetermined period of time is configured by at least one of the user, an application that is implemented on the system or a platform that is implemented on the system.

Example N, the system of any of examples H-M, wherein the touch surface comprises at least one of a touch screen or a track pad.

Example O, one or more computer-readable storage media storing computer-readable instructions that, when executed, instruct one or more processors to perform operations comprising: identifying multiple short-lived user inputs that remained on a touch surface for less than a predetermined amount of time, each of the multiple short-lived user inputs being received from a user; identifying tool input on the touch surface that is received from an input tool; and analyzing the multiple short-lived user inputs to identify a hand of the user that is using the input tool, the analyzing being based at least in part on locations of the multiple short-lived user inputs on the touch surface and a location of the tool input on the touch surface.

Example P, the one or more computer-readable storage media of example O, wherein the operations further comprise: storing data for a user input in a first data structure in response to detecting the user input on the touch surface; in response to removal of the user input from the touch surface, determining that the user input is a short-lived user input that remained on the touch surface for less than the predetermined amount of time; and in response to determining that the user input is a short-lived user input, storing the data for the user input in a second data structure for a predetermined period of time and deleting the data for the user input from the first data structure.

Example Q, the one or more computer-readable storage media of any of examples O or P, wherein the analyzing includes: determining that more of the multiple short-lived user inputs are located on a particular side of the tool input than another side of the tool input; and identifying a hand of the user that corresponds to the particular side.

Example R, the one or more computer-readable storage media of any of examples O-Q, wherein the analyzing includes: determining that the multiple short-lived user inputs are located on the touch surface within a particular proximity to each other; and identifying a hand of the user that corresponds to a side of the tool input where the multiple short-lived user inputs are located.

Example S, the one or more computer-readable storage media of any of examples O-R, wherein the operations further comprise: receiving information from the user that specifies the predetermined amount of time; and based at least in part on the information that is received from the user, utilizing the predetermined amount of time to identify short-lived input.

Example T, the one or more computer-readable storage media of any of examples O-S, wherein the analyzing includes: classifying a particular short-lived user input of the multiple short-lived user inputs as unintentional or intentional based at least in part on a distance from the particular short-lived user input on the touch surface to the tool input on the touch surface; and identifying the hand of the user that is using the input tool based at least in part on the classifying.

Example U, a method comprising: receiving, by a computing device, touch input from an input tool via a touch surface, the input tool comprising at least one of a stylus or another input item; identifying a hand of a user that is holding the input tool; establishing, by the computing device, an inactive region in the touch surface based at least in part on the hand of the user that is identified as holding the input tool, the inactive region surrounding a location of the touch input from the input tool; and suppressing touch input from the user that is received in the inactive region.

Example V, the method of example U, wherein the inactive region is established based on at least one of: a geometry of the touch surface; a geometry of the touch input from the user or another touch input from the user; a number of users that are interacting with the touch surface; information about the user that is associated with the input tool; information about an application that is currently running; an orientation of the touch surface; or a language of the user.

Example W, the method of any of examples U or V, further comprising: maintaining the inactive region in relation to the touch input from the input tool as the touch input from the input tool changes position on the touch surface.

Example X, the method of any of examples U-W, further comprising: maintaining the inactive region in the touch surface while touch input remains on the touch surface in the inactive region.

Example Y, the method of any of examples U-X, further comprising: detecting that touch input does not remain on the touch surface in the inactive region and that the touch input from the input tool is removed from the touch surface; and after a predetermined period of time has expired from the detecting, disabling the inactive region in the touch surface.

Example Z, the method of any of examples U-Y, wherein the inactive region extends from a location of the touch input of the input tool to a bottom edge of the touch surface and extends from the location of the touch input of the input tool to a top edge of the touch surface.

Example AA, the method of any of examples U-Z, further comprising: receiving touch input from another input tool via the touch surface; determining that another user is employing the other input tool; establishing another inactive region in the touch surface for the touch input that is from the other input tool, the other inactive region being based at least in part on user information for the other user; and suppressing touch input that is received in the other inactive region.

Example BB, a system comprising: a touch surface to receive touch input from an input tool; one or more processors communicatively coupled to the touch surface; memory communicatively coupled to the one or more processors; an inactive region module stored in the memory and executable by the one or more processors to define an inactive region in the touch surface in relation to the touch input from the input tool, the inactive region being defined based on at least one of (i) an orientation of the system, (ii) a language of a user that is employing the input tool or (iii) a geometry of at least one of the touch surface or touch input from the user; and a classification module stored in the memory and executable by the one or more processors to classify touch input that is received from the user in the inactive region as unintentional.

Example CC, the system of example BB, wherein the inactive region is defined based at least in part on a location of the touch input from the input tool and a direction of travel of the touch input from the input tool.

Example DD, the system of any of examples BB or CC, wherein the inactive region is defined based at least in part on the orientation of the system, the inactive region module configuring the inactive region to have first characteristics when the system is oriented in a first orientation and configuring the inactive region to have second characteristics when the system is oriented in a second orientation, each of the first characteristics and the second characteristics comprising at least one of a size, a shape or a position.

Example EE, the system of any of examples BB-DD, wherein the inactive region is defined based at least in part on the language of the user, the inactive region module configuring the inactive region to have first characteristics when the user communicates in a first language and configuring the inactive region to have second characteristics when the user communicates in a second language, each of the first characteristics and the second characteristics comprising at least one of a size, a shape or a position.

Example FF, the system of any of examples BB-EE, wherein the inactive region is defined based at least in part on the geometry of the touch surface, the geometry of the touch surface comprising at least one of a size, a shape or a position, at least one of a size, a shape or a position of the inactive region being related to at least one of the size, the shape or the position of the touch surface.

Example GG, the system of any of examples BB-FF, wherein the inactive region is defined based at least in part on the geometry of the touch input from the user, the geometry of the touch input from the user comprising at least one of a size, a shape or a position, at least one of a size, a shape or a position of the inactive region being related to at least one of the size, the shape or the position of the touch input from the user.

Example HH, the system of any of examples BB-GG, wherein the classification module is configured to: determine that one or more additional touch inputs received from the user in the inactive region satisfy one or more criteria related to at least one of velocity, direction of travel or number of touch inputs; and in response to determining that the one or more additional touch inputs from the user satisfy the one or more criteria, classify the one or more additional touch inputs from the user as intentional.

Example II, one or more computer-readable storage media storing computer-readable instructions that, when executed, instruct one or more processors to perform operations comprising: receiving touch input from an input tool via a touch surface; identifying a particular region of the touch surface based on at least one of (i) user information about a user that is associated with the input tool or (ii) application information about an application that is currently being implemented by the one or more processors, a location of the particular region being identified from a location of the touch input from the input tool; and disabling processing of touch input that is received from the user within the particular region of the touch surface.

Example JJ, the one or more computer-readable storage media of example II, wherein the particular region extends from a location of the touch input of the input tool to content that is displayed by the application that is currently being implemented by the one or more processors.

Example KK, the one or more computer-readable storage media of any of examples II or JJ, wherein the operations further comprise: obtaining a unique identifier from the input tool; and utilizing the unique identifier to obtain the user information, the user information indicating at least one of a preference for the user, a characteristic about an extremity of the user, a handedness of the user or a language of the user; wherein the particular region of the touch surface is identified based at least in part on the user information.

Example LL, the one or more computer-readable storage media of any of examples II-KK, wherein the particular region of the touch surface is identified based at least in part on the application information, the application information indicating at least one of a type of application that is currently being implemented or content that is displayed by the application via the touch surface.

Example MM, the one or more computer-readable storage media of any of examples II-LL, wherein the operations further comprise: receiving one or more additional touch inputs from the user in the particular region; determining that at least one of (i) a velocity of the one or more additional touch inputs from the user satisfies a velocity criterion, (ii) a direction of travel of the one or more additional touch inputs from the user is in particular direction or (iii) a number of the one or more additional touch inputs from the user satisfies a number criterion; and in response to the determining, enabling processing for the one or more additional touch inputs from the user.

Example NN, the one or more computer-readable storage media of any of examples II-MM, wherein the operations further comprise: detecting that the touch input from the input tool is removed from the touch surface and touch input is not received from the user in the particular region; and enabling processing of touch input that is received from the user within the particular region of the touch surface.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   receiving, by a computing device, multiple user touch inputs from a user via a touch surface;
   determining that one or more user touch inputs of the multiple user touch inputs are removed from the touch surface;
   based at least in part on determining that the one or more user touch inputs are removed from the touch surface, determining, by the computing device, that the one or more user touch inputs remained on the touch surface for less than a predetermined amount of time;
   based at least in part on determining that the one or more user touch inputs remained on the touch surface for less than the predetermined amount of time, storing data regarding the one or more user touch inputs in memory;
   receiving, by the computing device, tool touch input from an input tool via the touch surface;
   retrieving the data regarding the one or more user touch inputs from the memory;
   analyzing the data regarding the one or more user touch inputs to determine a first number of the one or more user touch inputs that are received on one side of the tool touch input and a second number of the one or more user touch inputs that are received on another side of the tool touch input; and
   determining whether the user is employing the input tool with a left-hand or a right-hand based at least in part on the first number and the second number.

2. The method of claim 1, wherein the multiple user touch inputs comprise multiple recent touch inputs received during a period of time leading up to a time when the analyzing is performed, the period of time being less than a predetermined period of time.

3. The method of claim 1, wherein the input tool comprises at least one of a stylus, pen or another input item.

4. The method of claim 1, wherein the analyzing includes:
   determining that one or more locations of the one or more user touch inputs are clustered together on the touch surface within a particular proximity to each other; and
   identifying a side of the tool touch input where the one or more locations of the one or more user touch inputs are clustered together; and
   wherein the determining whether the user is employing the input tool with the left-hand or the right-hand is further based at least in part on the identified side.

5. The method of claim 1, further comprising determining that the first number is greater than the second number; and
   wherein the determining whether the user is employing the input tool with the left-hand or the right-hand is based at least in part on determining that the first number is greater than the second number.

6. The method of claim 1, wherein the analyzing includes:
   determining that a location of a particular touch input, from among the one or more user touch inputs, on the touch surface is within a predetermined proximity to a location of the tool touch input on the touch surface; and
   classifying the particular touch input as unintentional; and
   wherein the determining whether the user is employing the input tool with the left-hand or the right-hand is based at least in part on the particular touch input.

7. The method of claim 1, wherein the analyzing includes:
   determining that a location of a particular touch input, from among the one or more user touch inputs, on the touch surface is outside a predetermined proximity to a location of the tool touch input on the touch surface; and
   classifying the particular touch input as intentional; and
   wherein the determining whether the user is employing the input tool with the left-hand or the right-hand is based at least in part on another touch input of the one or more user touch inputs.

8. A system comprising:
   a touch surface to receive multiple user touch inputs from a user and tool touch input from an input tool;
   one or more processors communicatively coupled to the touch surface; and
   memory communicatively coupled to the one or more processors and storing executable instructions that, when executed by the one or more processors, cause the one or more processors to perform operations comprising:
      determining that each of the multiple user touch inputs remained on the touch surface for less than a predetermined amount of time;
      based at least in part on determining that each of the multiple user touch inputs remained on the touch surface for less than the predetermined amount of time, storing data for individual ones of the multiple user touch inputs in the memory for a predetermined period of time;
retrieving the data for individual ones of the multiple user touch inputs from the memory;
based at least in part on the data, calculating a value representing a number of user touch inputs on one side of the tool touch input relative to a number of user touch inputs on another side of the tool touch input; and
utilizing the value to determine whether the user is employing the input tool with a left-hand or a right-hand.

9. The system of claim 8, wherein the value comprises a ratio of the number of user touch inputs on the one side of the tool touch input to the number of user touch inputs on the other side of the tool touch input.

10. The system of claim 9, wherein the utilizing the value includes:
determining that the ratio is greater than a predetermined ratio; and
in response to determining that the ratio is greater than a predetermined ratio, determining whether the user is employing the input tool with the left-hand or the right-hand based at least in part on the ratio.

11. The system of claim 8, wherein the operations further comprise:
in response to expiration of the predetermined period of time, cause the data to be deleted from the memory.

12. The system of claim 8, wherein the operations further comprise:
determining that at least some of the multiple user touch inputs are received on the touch surface within a particular proximity to each other; and
utilizing a location of the at least some of the multiple user touch inputs to determine whether the user is employing the input tool with the left-hand or the right-hand.

13. The system of claim 8, wherein at least one of the predetermined amount of time or the predetermined period of time is configured by at least one of the user, an application that is implemented on the system or a platform that is implemented on the system.

14. The system of claim 8, wherein the touch surface comprises at least one of a touch screen or a track pad.

15. One or more computer storage media storing computer-readable instructions that, when executed, instruct one or more processors to perform operations comprising:
storing data for a user input in a first data structure in response to detecting the user input on a touch surface;
in response to removal of the user input from the touch surface, determining that the user input is a short-lived user input that remained on the touch surface for less than a predetermined amount of time;
in response to determining that the user input is the short-lived user input, storing the data for the user input in a second data structure for a predetermined period of time;
identifying tool input on the touch surface that is received from an input tool;
analyzing the data for user input to determine that a location of the short-lived user input on the touch surface is within a predetermined distance to a location of the tool input on the touch surface; and
determining a hand of the user that is using the input tool based at least in part on the location of the short-lived user input on the touch surface and the location of the tool input on the touch surface.

16. The one or more computer storage media of claim 15, wherein the operations further comprise:
deleting the data for the user input from the first data structure based at least in part on determining that the user input is the short-lived user input.

17. The one or more computer storage media of claim 15, wherein the analyzing includes determining that more of the multiple short-lived user inputs are located closer to a particular side of the tool input than another side of the tool input;
wherein the determining the hand of the user that is using the input tool comprises determining the hand of the user that corresponds to the particular side.

18. The one or more computer storage media of claim 15, wherein the analyzing includes determining that at least some of the multiple short-lived user inputs are located on the touch surface within a particular proximity to each other; and
wherein the determining the hand of the user that is using the input tool comprises determining the hand of the user that corresponds to a side of the tool input where the at least some of the short-lived user inputs are located.

19. The one or more computer storage media of claim 15, wherein the operations further comprise:
receiving information from the user that specifies the predetermined amount of time; and
based at least in part on the information that is received from the user, utilizing the predetermined amount of time to identify short-lived input.

20. The one or more computer storage media of claim 15, wherein the operations further comprise classifying the short-lived user input as unintentional based at least in part on determining that the location of the short-lived user input is within the predetermined distance to the location of the tool input on the touch surface.

* * * * *

UNITED STATES PATENT AND TRADEMARK OFFICE
CERTIFICATE OF CORRECTION

PATENT NO. : 9,626,020 B2  
APPLICATION NO. : 14/485510  
DATED : April 18, 2017  
INVENTOR(S) : Durojaiye et al.

Page 1 of 1

It is certified that error appears in the above-identified patent and that said Letters Patent is hereby corrected as shown below:

On the Title Page

Item (73), change "Assignee" to -- Microsoft Technology Licensing, LLC --.

Signed and Sealed this  
Fourteenth Day of August, 2018

Andrei Iancu  
*Director of the United States Patent and Trademark Office*